July 6, 1937.  G. KEITH  2,085,911

INCANDESCENCE GAS LAMP

Filed Dec. 11, 1936  2 Sheets-Sheet 1

Inventor
George Keith
By Pennie, Davis, Marvin & Edmonds
Attorneys

July 6, 1937.  G. KEITH  2,085,911

INCANDESCENCE GAS LAMP

Filed Dec. 11, 1936   2 Sheets-Sheet 2

Inventor
George Keith
By Pennie Davis Marvin & Edmonds
Attorneys

Patented July 6, 1937

2,085,911

UNITED STATES PATENT OFFICE 2,085,911

INCANDESCENCE GAS LAMP

George Keith, London, England, assignor to James Keith & Blackman Company Limited, London, England, a company of Great Britain Application December 11, 1936, Serial No. 115,287
In Great Britain November 8, 1935

7 Claims. (Cl. 67—94)

This invention relates to improvements in inverted incandescence gas lamps for burning gas, say, at ordinary public supply pressures, and adapted primarily for outdoor use.

More especially, the invention is concerned with that type of gas lamp including a body surmounted by a chimney or chimneys and accommodating an injector device or devices for delivering combustible mixture to a burner carrying an incandescence mantle or mantles.

In the specific embodiment of the invention hereindescribed the burner head is of the mitrailleuse type in which the gas and primary air traverse a bunch or row of depending tubes and the remaining air traverses the space around the tubes.

The invention consists of an inverted incandescence gas lamp of the type referred to including a siphon tube or tubes disposed partly within and partly exteriorly of a chimney for thermally siphoning air into the burner.

Figures 1, 2:
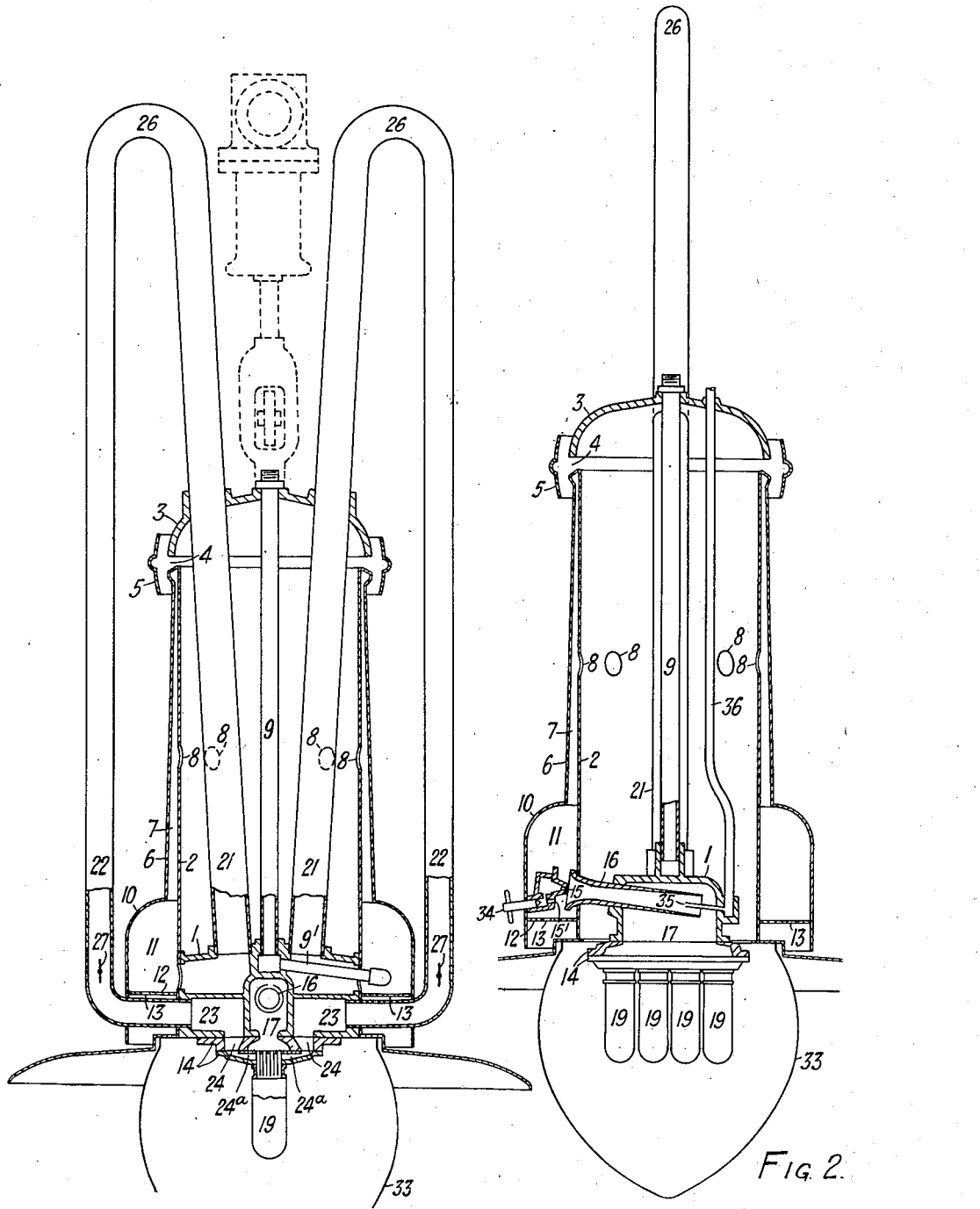
Figure 3:
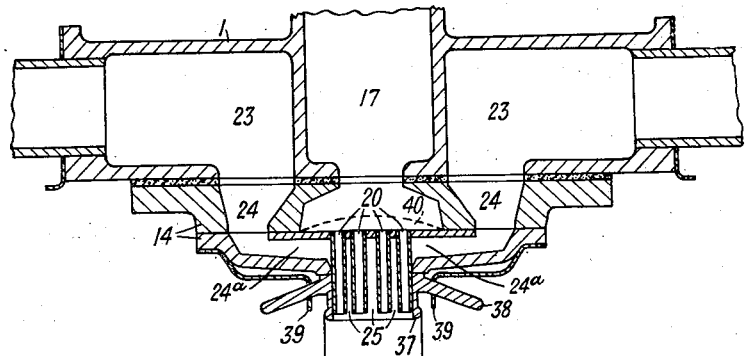
Figure 4:
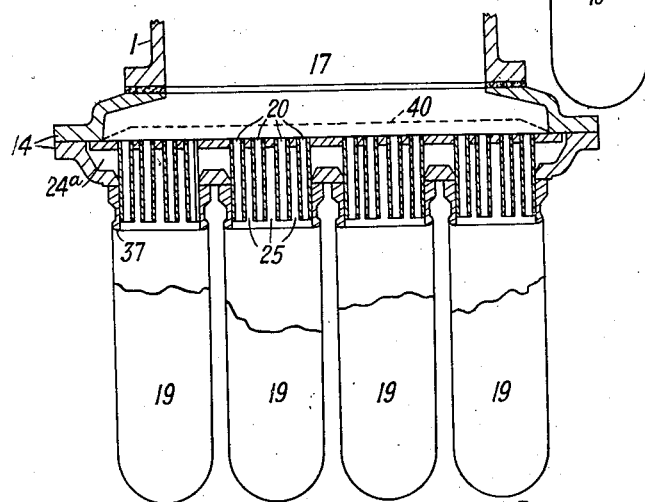
Figure 5:
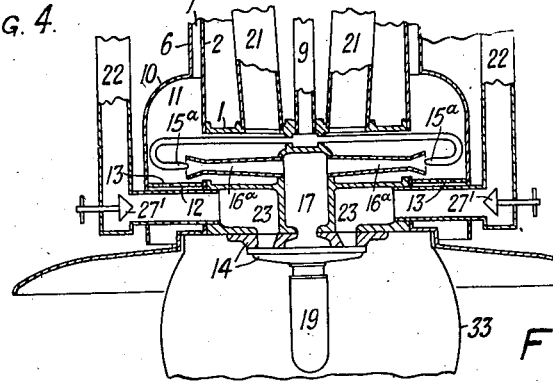

An inverted incandescence gas lamp constructed in accordance with the present invention is illustrated by way of example in the accompanying drawings in which Figs. 1 and 2 are vertical sections at right angles to one another, and Figs. 3 and 4 are detail vertical sections, drawn to a larger scale, in the same planes as Figs. 1 and 2, respectively, of the burner head. Fig. 5 is a fragmentary vertical section in the same plane as Fig. 1, showing a modified construction incorporating two injector devices.

Referring to Figs. 1 to 4 of the drawings, upstanding from a hollow lamp body indicated generally at 1 is a chimney 2 surmounted by a hood 3 defining with the top of the chimney 2 the chimney outlet 4 to atmosphere. The outlet 4 is shrouded by a cowl 5. The chimney 2 is surrounded by an outer casing 6 defining therewith an annular air space 7 communicating with the interior of the chimney by way of ports 8 in the chimney 2. The lamp assembly is carried by a gas supply tube 9 extending axially of the chimney 2 and connected at its lower end to the lamp body 1 and at its upper end to lamp suspension means shown in dotted lines in Fig. 1.

A skirt 10 forming a downward continuation of the casing 6 and surrounding the lamp body 1 defines with the lower part of the chimney 2 an air chamber 11 communicating with the air space 7. A diaphragm 12 forming the base of the air chamber 11 is provided with a plurality of atmospheric air inlet ports 13 of restricted total area in comparison with that of the ports 8.

The burner tubes 20 are supplied with combustible mixture by an injector device including a gas nozzle 15 discharging into a Venturi tube 16, which in turn discharges by way of a central chamber 17 into the burner tubes 20. The inlet end of the Venturi tube 16 is open to the air chamber 11 which accommodates also the nozzle 15, the gas stream from which induces air from the air chamber 11 to enter the Venturi tube 16. Gas is supplied to the nozzle 15 from the tube 9 through a branch tube 9'. To permit control of the quality of the combustible mixture there is adjoined to the nozzle 15 an orifice 15' delivery of gas through which is variable by adjustment of a needle valve 34, and which is adapted to admit a small flow of gas to the Venturi tube 16 without exercising a material air-inducing action. To permit momentary enrichment of the mixture within the chamber 17, when lighting or when extinguishing the lamp, there is provided a small tube 35 projecting into the outlet end of the Venturi tube 16 and supplied with gas through a tube 36 which is controlled by an automatic valve (not shown) of known construction. The combustible mixture discharged by the injector device passes into each of a plurality of mantles 19 by way of a plurality of small burner tubes 20, shown best in Figs. 3 and 4.

Connected at their lower ends to the air chamber 11 are two up-comer tubes 21 constituting limbs of a pair of inverted U-tubes of which the other limbs or down-comer tubes 22 are connected at their lower ends to chambers 23 disposed one on each side of the chamber 17 within the lamp body 1. These chambers 23, in which partial preheating of the secondary air is effected, communicate by way of openings 24 with the space 24ª surrounding the upper portions of the bunches of burner tubes 20. The lower parts of the tubes of each bunch project into a space 25 which constitutes the secondary air inlet to the respective mantle 19.

The up-comer tubes 21 ascend within the chimney 2 and rise to a height above the chimney about equal to the axial length of the chimney before merging into the return bends 26.

The U-tubes 21, 22 form, in effect, a pair of thermal siphons so devised that air from the air chamber 11 is heated by the chimney gases in ascending through these portions of the tubes 21 within the chimney 2; begins to cool in ascending through the upper portions of the tube 21; traverses the return bends 26 in which further cooling is effected to about atmospheric temperature, and descends through the tubes 22 at about atmospheric temperature.

The arrangement is such that there is set up within the return bends 26 a static pressure which is transmitted with small loss through the tubes 22 to the chambers 23 and to the spaces 25 so as to supply sufficient secondary air to the flames issuing from the burner tubes 20, at a pressure exceeding that existing inside the mantles, to ensure complete combustion of the mixture inside the mantles 19.

To permit control of the amount of secondary air thus supplied, an adjustable butterfly obturator 27 is provided within the lower end of each tube 22.

The mixture supplied by the injector device 15, 16 may be enriched to give the optimum effect by varying manually the resistance of the injector device, or by delivering neat gas to the mixture through the orifice 15'.

The ports 8 and 13 are so relatively dimensioned that the static air pressure in the air chamber 11 is always substantially equal to the pressure in the interior of the globe 33 into which the flames discharge.

It will be seen that with this arrangement, the inlet and the final outlet of the columns within the U-tubes 21, 22 being balanced statically by means of the ports 8, wind effect on the chimney 2 does not alter the pressure difference produced by the siphonic action of the U-tubes.

Owing to the position of the balancing ports 8, no secondary air is admitted directly into the globe 33, which has no direct communication with the air chamber 11. Apart from the fact that no further secondary air is required, this arrangement prevents spilling of products of combustion from the globe 33 into the air chamber, as may sometimes occur with the usual method of balancing the air chamber by connecting it directly with the upper part of the globe.

The U-tubes 21, 22 are arranged symmetrically on opposite sides of the vertical centre line of the lamp in the same vertical plane, and the tubes 21 embrace between them at their upper ends the lamp suspension means, the chimney 2 being of normal height, so that the distance from the mantles to the lamp support is about normal. With this arrangement the U-tubes may be extended to any suitable height above the lamp chimney without necessitating increase of said distance.

In the modification shown in Fig. 5 there are provided two injector devices including nozzles 15ª and associated Venturi tubes 16ª discharging into the chamber 17. Regulation of the supply of secondary air is obtained by adjustment of obturators 27' within the lower portions of the tubes 22.

The siphon tubes are shown plain in the drawings, but in practice the up-comer limb, or each up-comer limb, may be modified to ensure good transmission of the heat from the chimney gases to the ascending air. Thus, the tubes may be indented, or fitted with cross rods in staggered relation, or there may be inserted therein twisted strips of metal, or other suitable material, to produce turbulence and provide radiating and contacting surfaces. The upper portions and return bends of the U-tubes may also be ribbed externally or internally to provide increased radiating surface and to set up turbulence, as well as to ensure more rapid cooling of the air before descending.

For convenience, I have described the siphon tubes as U-tubes each comprising an up-comer limb and a down-comer limb. It is to be understood, however, that with suitable selection of the cross section there may be provided for each siphon tube more than one up-comer limb and/or more than one down-comer limb.

Each mantle 19 is carried by a ring 37 of refractory material provided with a pair of lugs 38 engageable with bayonet slots (not shown) in spring clips 39 attached to the bottom of the plate 14.

40 denotes a wire gauze fitted above the tubes 20 for the purpose of eliminating eddies in the combustible mixture, and to prevent the contents of the chamber 17 from exploding when the lamp is extinguished.

I claim:—

1. An inverted incandescence gas lamp comprising, in combination, a lamp body, at least one chimney surmounting said body, a burner fitted to said body, injector means serving to deliver combustible mixture to said burner, and at least one siphon tube disposed partly within and partly exteriorly of said chimney for thermally siphoning air into said burner.

2. An inverted incandescence gas lamp comprising, in combination, a lamp body, a burner head fitted to said body and comprising spaced depending tubes, injector means serving to deliver combustible mixture to said burner head, and a siphon device for thermally siphoning secondary air into said burner head.

3. An inverted incandescence gas lamp comprising, in combination, a lamp body, a burner head fitted to said body and comprising spaced depending tubes, injector means serving to deliver combustible mixture to said tubes, and a siphon device for thermally siphoning secondary air into the space around said tubes.

4. An inverted incandescence gas lamp comprising, in combination, a lamp body, a burner fitted to said body, a chimney surrounding said body, a casing surrounding said chimney and defining therewith an air space ported to the interior of said chimney, an air chamber communicating with said air space, at least one injector device in communication with said chamber, said device serving to deliver combustible mixture to said burner, and at least one siphon tube in communication with said chamber and disposed partly within and partly exteriorly of said chimney for thermally siphoning secondary air to said burner.

5. An inverted incandescence gas lamp comprising, in combination, a lamp body, at least one chimney surmounting said body, a burner fitted to said body, injector means serving to deliver combustible mixture to said burner, at least one siphon tube disposed partly within and partly exteriorly of said chimney for thermally siphoning secondary air into said burner, and means for controlling the supply of secondary air to said burner.

6. An inverted incandescence gas lamp comprising, in combination, a lamp body, a burner fitted to said body, a chimney surmounting said body and formed with ports, a casing surrounding said chimney and defining therewith an air space in communication with the interior of said chimney, an air chamber having communication with said air space, and having ports open to the atmosphere and of less total area than said first mentioned ports, at least one injector device in communication with said chamber, said device serving to deliver combustible mixture to said burner, and at least one siphon tube in communication with said chamber and disposed partly within and partly exteriorly of said chimney for thermally siphoning secondary air to said burner.

7. An inverted incandescence gas lamp comprising, in combination, a lamp body, at least one chimney surmounting said body, a burner fitted to said body, injector device means serving to deliver combustible mixture to said burner, suspension means for said lamp, and siphon tubes each disposed partly within and partly exteriorly of said chimney for thermally siphoning air into said burner, said siphon tubes embracing said suspension means.

GEORGE KEITH.